A. L. JENNINGS.
AUGER BIT AND BRACE.
APPLICATION FILED MAR. 3, 1911.
1,127,007.
Patented Feb. 2, 1915.
2 SHEETS—SHEET 1.
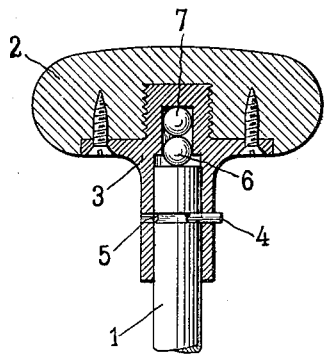
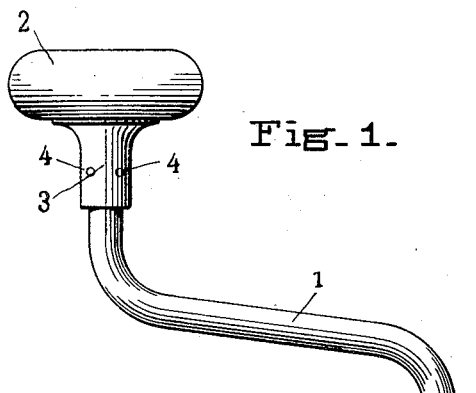
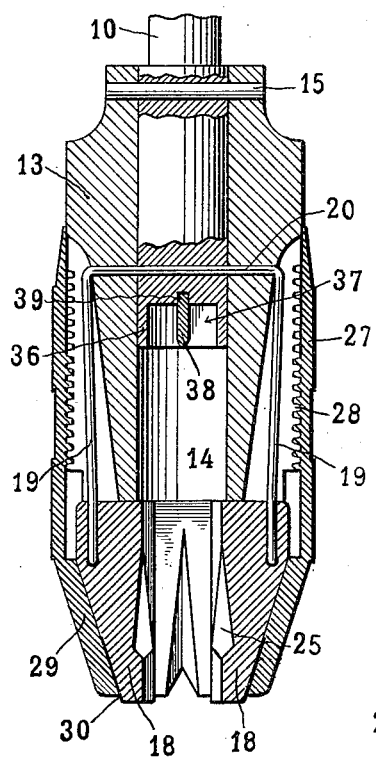
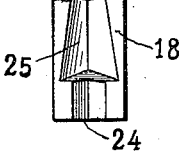
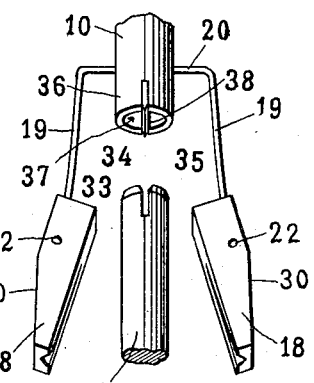
WITNESSES:
J. Clyde Ripley
E. Bradford
INVENTOR
Arthur L. Jennings.
BY
ATTORNEY A. L. JENNINGS.
AUGER BIT AND BRACE.
APPLICATION FILED MAR. 3, 1911.
1,127,007.
Patented Feb. 2, 1915
2 SHEETS—SHEET 2.
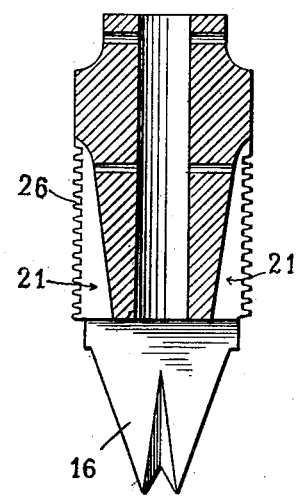
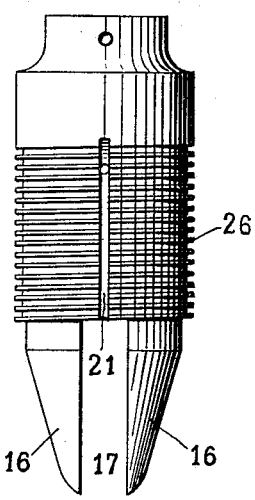
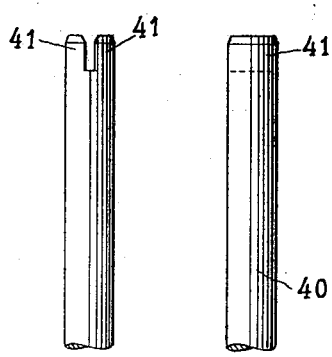
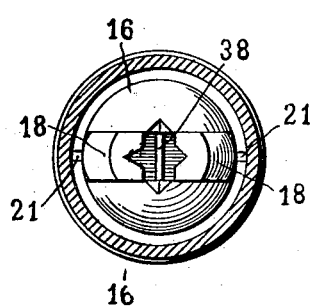
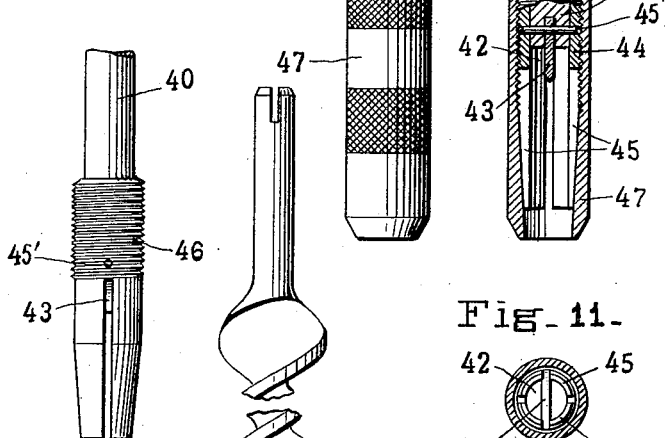
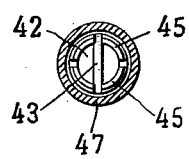
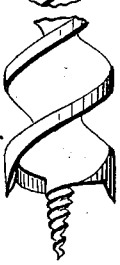
WITNESSES:
INVENTOR
Arthur L. Jennings.
ATTORNEY

UNITED STATES PATENT OFFICE.

ARTHUR L. JENNINGS, OF DEEP RIVER, CONNECTICUT.

AUGER BIT AND BRACE.

1,127,007.

Specification of Letters Patent. Patented Feb. 2, 1915.

Application filed March 3, 1911. Serial No. 612,124.

*To all whom it may concern:*

Be it known that I, ARTHUR L. JENNINGS, a citizen of the United States, and resident of Deep River, in the county of Middlesex and State of Connecticut, have invented certain new and useful Improvements in Auger Bits and Braces, of which the following is a specification.

My invention relates particularly to the socket or chuck for a bit brace or the like.

Difficulty is encountered with ordinary auger bits by reason of the fact that it is practically impossible to have the shank properly alined in manufacturing and practically imposible to accurately center the bit in the chuck of the brace.

The main object therefore of my invention is to provide a socket or chuck for an auger bit or similar tool which can be accurately made for accurately centering and securely holding the same so as to bore a perfectly straight hole.

The handle and bit constructions are not claimed herein but are reserved for future applications.

As a species of my invention which may be said to be intermediate the chuck and bit improvements I have illustrated an extension member adapted to coöperate with the bit brace and also having a chuck portion adapted to hold a bit.

Briefly considered the main features of the invention resides in the construction of a chuck having a double centering socket and spring pressed jaws. The tool shank is cylindrical and provided with a deep central groove forming fingers for coöperating with the chuck.

Figure 1, is a side view of a bit brace embodying the improvements of my invention. Fig. 2, is a sectional view of the end handle showing a fragment of the arm of the brace. Fig. 3, is an enlarged longitudinal sectional view of the brace chuck. Fig. 4, is a perspective view showing the end of the chuck spindle and the bit together with the spring pressed jaws. Fig. 4ª, is a face view and section of one of the chuck jaws showing the method of anchoring the spring arm. Fig. 5, is a side view of the chuck body. Fig. 6, is a longitudinal sectional view of the same on the plane at right angles to the view of Fig. 5. Fig. 7, is an end view of the chuck, the adjusting sleeve being shown in section. Fig. 8, is a side view of what may be termed an extension bar and chuck. Fig. 9, is a side view of the same, parts being shown in section. Fig. 10, is a side view of the end of the extension chuck, the adjusting sleeve being omitted. Fig. 11, is a cross sectional view of the extension chuck. Fig. 12, is a side view of an auger bit embodying the improvements of my invention.

The arm or shank 1 is of suitable form carrying the chuck and suitable handles. The end handle or rest 2 has a metal socket 3 suitably secured to it and held by means of a pin or pins 4 projecting into the groove 5 so that the handle can rotate on the end of the arm 1 but will not move longitudinally. In the socket 5 I provide ball bearings 6 and 7 for reducing the friction and affording hard and durable bearing surfaces. This prevents the parts from binding.

The chuck spindle 10 is secured to the arm 1 in any suitable manner as for instance by means of the bracket 11. Any suitable form of ratchet mechanism may be employed if desired for instance, as indicated at 12.

The body 13 of the chuck has a longitudinal passage 14 into which the end of the spindle 10 fits. The pin 15 holds the body of the chuck securely on the spindle 10 so as to prevent rotation or longitudinal movement. The end of the chuck body 13 is provided with a pair of prongs 16, 16 having a slot 17 between them in which the jaws 18, 18 fit. These jaws are elastically carried by a spring wire frame consisting of the arms 19, 19 and the cross member 20. The latter passes through the body of the chuck and the end of the spindle 10 as shown in Fig. 3. The sides of the body are grooved as at 21, 21 to receive the arms 19, 19. Each arm is anchored to its jaw in a suitable manner as for instance, as shown in Fig. 4ª. The jaw is provided with a transverse hole 22 and the end of the arm 19 is off-set as at 23 by means of a blow imparted by a tool inserted in the hole 22. The faces of the jaws are so formed as to properly grip the cylindrical shank on the bit in the preferred use of the invention and also so as to grip the tapering square end of a bit commonly used. For this purpose the faces of the jaws are provided with a somewhat sharp cornered recess 24 by means of which the rounded shank of the tool is engaged. The inner face of each jaw is also provided with a recess such as 25 for receiving the end of an ordinary bit when it may be desired to use the same.

The outer wall of the body of the chuck is provided with screw threads such as 26 adapted to be engaged by interior threads 28 on the sleeve 27. The outer end of the sleeve 27 is contracted at 29 for engaging the sloping wall 30, 30 of the jaws 18, 18 so that as the sleeve is tightened or loosened the jaws are tightened or loosened.

As before stated this invention is particularly directed to the use of cylindrical shank tools such as auger bits and the like. The shank 32 of the tool has two prongs at the end such as 33, 33 with a deep slot 34 between them (see Fig. 4). The ends of these prongs 33, 33 are preferably beveled or considerably rounded as at 35 in order to facilitate entering the chuck and avoid injury when in use. The extension end 36 of the spindle 10 is provided with a recess 37 forming a socket for the end of a tool shank. This socket is divided into two parts by means of the cross plate 38 which is fixed into the end of the spindle and bridges across the extension 36. The end of this plate is therefore held across its entire width as at 39 in the solid end of the spindle 10 and the sides of the plate are held in the walls of the extension 36. The outer end of the cross plate 38 may also be beveled as shown in Figs. 3 and 4 so that the end of the tool shank may be more readily inserted into the end of the spindle.

By this construction it is possible to form a bit and shank which are in perfect alinement and thus avoid the difficulties of the usual old style square tapered shank. Inasmuch as the spindle socket 37 is absolutely central with the spindle and the adjusting sleeve 27 keeps the jaws 18, 18 in perfect alinement in the chuck body, a tool shank such as 32 is centered in the spindle socket 37 by the gripping chuck jaws 18, 18 in perfect alinement with the spindle 10. It is a comparatively easy matter to form the end of the shank 32 with symmetrical prongs 33, 33 by simply sawing or cutting a central slot in the end of the shank. The socket 37 can be readily made perfectly central with the spindle 10 by boring a hole in the end of the spindle so as to form the extension walls 36. The cross plate 38 may be located centrally by sawing or otherwise cutting a central slot in the extension 36, and into the solid end of the spindle 10. By reason of the method of anchoring the cross plate in the end of the spindle and extension a thin and hardened cross plate may be used. On account of the use of such a thin cross plate it is necessary to form only a narrow slot in the end of the tool shank. The gripping jaws 18, 18 in some cases may grip the tool shank with sufficient pressure to hold it against rotation but I prefer to provide a socket and cross plate in the spindle end as above described so that there can be no possibility of the tool turning in the chuck.

The extension member illustrated in Figs. 8, 9, 10 and 11 has its shank 40 provided with two prongs 41, 41 similar to the end of the auger bit shank so that it can be used in the chuck previously described. The extension member itself has a chuck of somewhat different type from that above described but having a socket 42 divided into two parts by the cross plate 43 so as to accommodate the end of an auger bit or other similar tool. In the form shown the socket 42 is formed by a tubular member 44 secured on the end of the shank 40 and extending beyond it. This tubular member 44 is secured to the shank in a suitable manner as for instance, by means of a pin 45' which also secures the cross plate 43 in place. The tubular member 44 also has spring jaws 45, 45 formed by splitting the end of the tube into four parts by cross slots. The outside of the tube 44 is threaded at 46 to receive the interior threaded adjusting sleeve 47 by means of which the clamping fingers or jaws 45 may be drawn toward each other to clamp the end of a tool shank.

The necessity of having a tool and its shank in perfect alinement and held properly central in its chuck or holder is particularly apparent when the tool is to be run at relatively high speed. In such cases the slightest inaccuracy of construction or adjustment makes the tool wabble and sometimes so badly as to make it impossible to use the tool at all and not only endangers the tool but the workman as well as the material upon which he is operating. The advantages therefor of the properly centered tool will be apparent to those acquainted with the art.

It should be understood that I have not limited my claims to the specific details and that I realize many changes may be made without departing from the spirit and scope of the invention.

What I claim is:—

1. In a tool chuck, a member having a longitudinal tool receiving passage and a cylindrical centering socket in the inner end of said passage of a size to receive and center the end of the cylindrical shank of a tool inserted in the tool receiving passage, a central transverse tool driving blade seated in said centering socket to engage in a driving slot in the end of the cylindrical tool shank, a pair of jaws having gripping surfaces parallel to the axis of said centering socket and equi-distant therefrom for holding the cylindrical tool shank, spring arms carrying said jaws and permitting said jaws to adapt themselves to the cylindrical tool shank and a clamping sleeve for said jaws and surrounding the parts adjacent said transverse tool driving blade.

2. In a tool chuck, the combination of a body having a central spindle and a central cylindrical tool centering socket provided with a transverse groove in the end wall thereof and coincident longitudinal grooves in the side walls thereof, a cross plate having its inner edge and side edges engaged in the transverse end and longitudinal side grooves in the end and side walls of the tool centering socket, yielding jaws and means for clamping said jaws in alinement with the said spindle and socket.

3. In a tool chuck, the combination of a body having a central spindle and a central cylindrical rigid tool centering socket, a driving plate extending transversely across the cylindrical tool centering socket, prongs extending from the body and separated by a central slot, jaws having parallel clamping edges and mounted to slide laterally in said central slot and means for moving said jaws in parallelism and for clamping them in alinement with said spindle and tool centering socket.

4. A chuck for a tool having a cylindrical shank with a slotted end, comprising a rigid chuck body having external screw threads and provided with an internal central cylindrical centering socket of a size to receive and center the cylindrical end of the tool shank, a blade disposed transversely of the centering socket to engage the slot in the end of the tool shank, said blade having its ends seated in opposite side walls of the centering socket whereby to securely anchor the ends of the blade and expose a length of the blade equal to the diameter of the slotted cylindrical end of the tool shank, spring cylindrical end of the tool shank, spring jaws disposed concentric to the centering socket and having parallel gripping surfaces with a passage between them in line with said centering socket and an interiorly threaded sleeve engaged on the threads of the rigid chuck body adapted to move the spring jaws inward into clamping engagement with the cylindrical shank of the tool centered in the socket.

5. In a tool chuck, a spindle having a cylindrical recess in the end thereof and a transverse slot intersecting said recess, a transverse blade secured in the slot of the spindle, a head secured on said spindle and laterally surrounding said blade and having a transverse slot at its outer end, jaws guided in said slot and a sleeve for clamping said jaws.

ARTHUR L. JENNINGS.

Witnesses:
 WM. L. BATES,
 C. N. BATES.